(12) United States Patent
Lynch et al.

(10) Patent No.: US 12,256,143 B2
(45) Date of Patent: Mar. 18, 2025

(54) ELECTRONIC DEVICE SYSTEMS FOR IMAGE SHARING

(71) Applicant: Apple Inc., Cupertino, CA (US)

(72) Inventors: Stephen Brian Lynch, Portola Valley, CA (US); Kevin M Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 294 days.

(21) Appl. No.: 17/698,943

(22) Filed: Mar. 18, 2022

(65) Prior Publication Data

US 2023/0300458 A1   Sep. 21, 2023

(51) Int. Cl.
| | |
|---|---|
| *H04N 23/661* | (2023.01) |
| *G06F 3/04842* | (2022.01) |
| *G06F 3/0488* | (2022.01) |
| *G06V 40/10* | (2022.01) |
| *H04N 23/62* | (2023.01) |
| *H04W 4/02* | (2018.01) |
| *H04W 4/06* | (2009.01) |
| *H04W 4/80* | (2018.01) |

(52) U.S. Cl.
CPC ......... *H04N 23/661* (2023.01); *G06F 3/0488* (2013.01); *H04N 23/62* (2023.01); *G06F 3/04842* (2013.01); *G06V 40/10* (2022.01); *H04W 4/023* (2013.01); *H04W 4/06* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 9,641,968 B2 | 5/2017 | Jain et al. | |
| 9,906,610 B1 | 2/2018 | Foster et al. | |
| 10,334,158 B2 | 6/2019 | Gove | |
| 10,900,772 B2 | 1/2021 | Sabitov et al. | |
| 11,010,596 B2 | 5/2021 | Donnenfeld | |
| 2006/0158544 A1* | 7/2006 | Nakajima | H04N 23/661 |
| | | | 348/E5.038 |
| 2014/0125823 A1* | 5/2014 | Johnson | H04N 1/00137 |
| | | | 348/207.11 |
| 2015/0074206 A1* | 3/2015 | Baldwin | H04L 51/52 |
| | | | 709/206 |
| 2015/0319354 A1 | 11/2015 | Ichikawa et al. | |
| 2016/0125209 A1 | 5/2016 | Meyers | |

(Continued)

*Primary Examiner* — Mark T Monk
(74) *Attorney, Agent, or Firm* — Treyz Law Group, P.C.; G. Victor Treyz; Kendall P. Woodruff

(57) ABSTRACT

A system may have electronic devices with wireless communications circuitry. Devices may have cameras for capturing images. Images may be shared between nearby devices. A first device may wirelessly send an image capture request to a second device. In response to assent to the image capture request, a camera application may be launched on the second device. Upon capturing an image with a camera in the second device in response to user input to the camera application or receipt of a remote image capture command from the first device, the second device may automatically send the captured image to the first device and delete the captured image from the second device. Arrangements in which users are provided with images from a public camera system on a stationary or mobile platform and in which users at an event share images from their cameras are also provided.

14 Claims, 5 Drawing Sheets

(56) References Cited

U.S. PATENT DOCUMENTS

| | | |
|---|---|---|
| 2020/0063461 A1* | 2/2020 | Gharabegian ........ A45B 25/143 |
| 2021/0042830 A1 | 2/2021 | Burke |
| 2021/0075754 A1 | 3/2021 | Spiry |

* cited by examiner

ELECTRONIC DEVICE SYSTEMS FOR IMAGE SHARING

FIELD

This relates generally to electronic devices, and, more particularly, to sharing content between electronic devices.

BACKGROUND

Electronic devices are often carried by users. Electronic devices may have wireless communications circuitry that is used to transmit and receive wireless information. This allows users to communicate with each other. For example, users may send electronic mail messages to each other and may have cellular telephone calls with each other. Electronic devices may have cameras that allow users to capture images.

SUMMARY

Cameras in a system of electronic devices may be used to capture images. Captured images may then be shared between the users of the devices.

In an illustrative embodiment, electronic devices such as cellular telephones or other portable electronic devices have cameras for capturing images. A first user may approach a second user to ask whether the second user is willing to use their device to capture an image of the first user. If the second user is willing to help capture this image, the first user may wirelessly send an image capture request to the second user using near-field communications or other wireless communications. In response to acceptance of the request by the second user at the second user's device, the second user's device may launch a camera application. Upon capturing an image with a camera in the second user's device in response to user input to the camera application or a remote image capture command from the first user's device, the second user's device may automatically send the captured image to the first user's device and may delete the captured image from the second user's device. In this way, the second user may take a picture of the first user for the first user without requiring the first user to lend their device to the second user and without requiring the second user to touch the device of the first user.

In additional embodiments, users may be provided with images from a public camera system on a stationary platform or a mobile platform such as a drone. The camera system in this type of arrangement may wirelessly detect the presence of users who have previously registered with the camera system and may use registration information in distributing captured images to those users. At an event, an electronic device such as a server or other cloud computing equipment may receive images that have been captured by attendees at the event. The images may be uploaded wirelessly to the computing equipment and may be filtered by the computing equipment before being shared with the attendees. As an example, images may be distributed selectively following image processing operations to identify attendees in the images.

DETAILED DESCRIPTION

Electronic devices are often carried by users as they conduct their daily activities. Some electronic devices such as cellular telephones contain cameras, which allows users to capture images. For example, a user on vacation may capture images of their vacation surroundings. Often users wish to capture images of themselves.

To capture images of themselves (sometimes referred to as "selfies"), users can use a selfie stick and a companion remote control device such as a Bluetooth® remote controller. Unfortunately, selfie-sticks are often banned from certain venues and can be bulky. As an alternative, a user can lend their cellular telephone to a stranger. The stranger can then use the user's own cellular telephone to capture an image of the user. It can be awkward, however, to relinquish one's device to a stranger and many people do not want to touch items that have been touched by others.

To facilitate the sharing of content such as images, systems may be provided that allow for wireless image sharing without requiring the lending of devices to strangers. Content can be shared wirelessly between a user of a device and a stranger who has their own device. In this type of arrangement, the user's device and stranger's device may communicate over a secure wireless link, so that an image of the user that is captured with the stranger's device can be privately sent to the user. If desired, the captured image can be provided to the user without being retained by the stranger's device. In other contexts, public equipment such as a public camera mounted on a fixed or moving platform can capture images of users that are shared with the user. Groups of users at an event may also share images with each other that have been captured with their individual devices.

Figure 1:
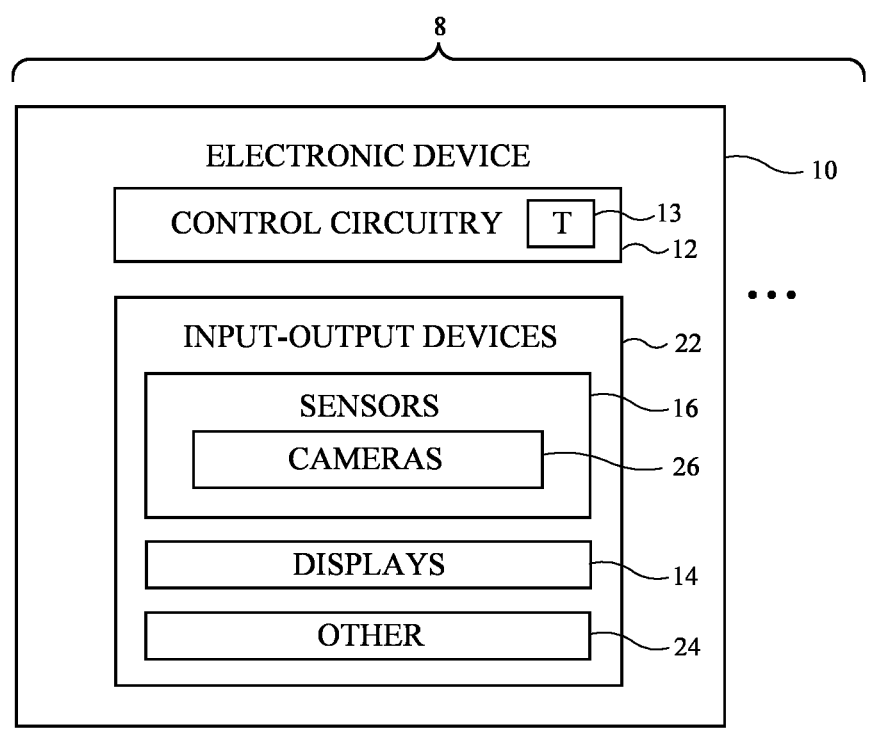
FIG. 1 is a diagram of an illustrative system in accordance with an embodiment.

FIG. 1 is a diagram of an illustrative system that may be used in wirelessly sharing content. The content that may be shared with system 8 of FIG. 1 may include digital images (e.g., still photographs and/or "live" images that include short amounts of video and audio), videos (moving images), audio clips, written content such as emails and text messages, captions and other text associated with still and/or moving images, graphics (e.g., emojis, animated GIFs, etc.), and/or other digital media. Embodiments in which the content shared using system 8 includes images are sometimes described herein as an example. In general, however, any suitable digital media items may be shared in system 10. The described embodiments in which captured images are shared are merely illustrative.

As shown in FIG. 1, system 8 may include multiple electronic devices 10. Devices 10 may include control circuitry 12 and input-output devices 22. Devices 10 may interact with each other using wireless signals and may communicate with each other over peer-to-peer wireless links and/or wireless communications links that involve one or more additional pieces of electronic equipment. Wireless circuitry and sensors and other circuitry in devices 10 may be used to ascertain device location and proximity between devices. This information may be used to support image sharing operations. As an example, information on a user's proximity to a stranger can be gathered and this information can be used to establish a secure wireless link between the user's device and stranger's device. As another example, information on a user's location can be gathered and this information may be used to determine whether the user is in proximity to a public camera or is near to other users at a group event.

Information on whether a user's electronic device is in a particular location (e.g., close to a known public camera location or close to one or more other electronic devices) may be obtained using location determination circuitry (sometimes referred to as location sensors, position sensing circuitry, etc.). As an example, location may be determined using satellite navigation system circuitry (e.g., a Global Positioning System receiver) and/or circuitry that ascertains location from cellular telephone tower signals, signals from wireless local area network access points at known locations, signals from wireless beacon devices, etc. In some embodiments, devices may determine whether they are in close proximity to each other by transmitting and receiving wireless signals. As an example, devices may transmit wireless local area network packets such as Bluetooth® advertising packets while monitoring for transmitted Bluetooth® advertising packets or other information transmitted by other devices. Near-field communications signals, ultrawideband (UWB) signals, and other wireless signals may also be used in ascertaining device location and/or device-to-device proximity.

If desired, received signal strength indicators can be obtained from received advertising packets. The magnitudes of the received signal strength indicators can be evaluated to help determine whether devices are close to each other. Larger signal strengths generally reveal that devices are in close proximity, whereas smaller signal strengths generally reveal that devices are farther apart. With near-field communications signals, signals are generally transmitted and received successfully only when a pair of devices are within close range of each other (e.g., about 20 cm or less for some near-field communications devices). Thus, successful near-field communications between a pair of devices can be used to confirm proximity. With devices having UWB wireless circuitry, UWB technology may be used for real-time location measurements. UWB systems may use time-of-flight measurements at multiple radio frequencies to measure device-to-device distance with high accuracy (e.g., devices 10 may use UWB for peer-to-peer ranging). If desired, UWB circuitry may be used to ascertain when a first device is pointed at a second device (e.g., when the longitudinal axis of a first cellular telephone is pointed at a second cellular telephone). This allows a first device to selectively communicate with a selected second device (e.g., when the users of the first and second device are close to each other).

In general, any suitable circuitry in electronic devices 10 may be used in transmitting and receiving wireless signals. These wireless operations in devices 10 of system 8 may include using near-field communications measurements, local area network measurements (e.g., Bluetooth® and/or WiFi® strength measurements, etc.), UWB measurements (e.g., time-of-flight wireless measurements), satellite navigation system measurements, and/or other wireless measurements to determine the positions (locations, orientations, proximity, etc.) of devices 10 with respect to each other. Devices 10 may include one or more mobile devices, one or more stationary devices (e.g., a public camera mounted on a stationary platform), drone-based public cameras and/or other mobile public equipment, and/or other electronic equipment. Devices 10 of FIG. 1 may include, for example, one or more laptop computers, networks of one or more computers forming servers and/or other cloud computing equipment, computer monitors containing embedded computers, tablet computers, desktop computers, cellular telephones, media players, or other handheld or portable electronic devices, smaller devices such as wristwatch devices, wristband devices, pendant devices, headphone or earpiece devices, head-mounted devices such as glasses, goggles, helmets, or other equipment worn on a user's head, or other wearable or miniature devices, televisions, computer displays that do not contain embedded computers, gaming devices, navigation devices, embedded systems such as systems in which equipment is mounted in a kiosk, in an automobile, airplane, or other vehicle, removable external cases for electronic equipment, accessories such as remote controls, computer mice, track pads, wireless or wired keyboards, or other accessories, wireless infrastructure devices such as cellular telephone towers, wireless access points, etc., and/or equipment that implements the functionality of two or more of these devices. Illustrative configurations in which electronic devices 10 include portable electronic devices such as cellular telephones, wristwatches, and portable computers, public equipment such as stationary or mobile cameras associated with an amusement park, event venue, or other organizations, and/or electronic devices that serve as cloud computing equipment for cloud computing services may sometimes be described herein as examples.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry 13 such as cellular telephone transceiver circuitry, wireless local area network transceiver circuitry (e.g., WiFi® circuitry), short-range radio-frequency transceiver circuitry that communicates over short distances using ultra high frequency radio waves (e.g., Bluetooth® circuitry operating at 2.4 GHz or other short-range transceiver circuitry), millimeter wave transceiver circuitry, ultra-wideband (UWB) wireless communications circuitry, near-field communications (NFC) circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit still and/or moving image data, audio data, and/or other data to another electronic device in system 8. Bluetooth circuitry may transmit Bluetooth advertising packets and other Bluetooth packets that are received by Bluetooth receivers in nearby devices. NFC circuitry may use NFC transceivers and NFC antennas to transmit and receive NFC signals. UWB circuitry may handle UWB wireless signal transmission and reception operations. Electronic devices in system 8 may use wired and/or wireless communications circuitry to communicate through one or more communications networks (e.g., the internet, local area networks, etc.). The communications circuitry may be used to allow data to be transmitted to and/or received by device 10 from external equipment (e.g., a tethered computer, a portable device such as a handheld device or laptop computer, online computing equipment such as a remote server or other remote computing equipment, an accessory such as a hands-free audio system in a vehicle or a wireless headset, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more optional displays such as displays 14. Displays 14 may be organic light-emitting diode displays or other displays with light-emitting diodes, liquid crystal displays, or other displays. Displays 14 may be touch sensitive (e.g., displays 14 may be touch screen displays that include two-dimensional touch sensors for capturing touch input from a user) and/or displays 14 may be insensitive to touch.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar sensors, three-dimensional radio-frequency sensors, or other sensors that gather three-dimensional image data), cameras 26 (e.g., infrared and/or visible digital image sensors for capturing still and/or moving images), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

During operation, devices 10 may transmit wireless signals such as Bluetooth signals, WiFi® signals, NFC signals, UWB signals, or other short-range wireless signals and may monitor for these signals from other devices 10. For example, devices 10 may transmit wireless signals such as Bluetooth advertising packets that are received by other devices 10. In transmitting Bluetooth advertisements (advertisement packets), a transmitting device may include information in the transmitted advertisements about the identity of the transmitting device. This information may be received by a receiving device and used to establish a wireless link between the receiving device and the transmitting device. An image taken on one device can then be wirelessly transmitted to the other (e.g., using a peer-to-peer link) or information can be exchanged allowing for a more indirect wireless link.

System 8 may be used to support the sharing of images. A first user may, as an example, send a wireless image capture request to a second user that asks whether the second user is willing to capture an image of the first user with the second user's camera and is then willing to wirelessly share that image of the first user by wirelessly transmitting the image to the first user. To ensure privacy for the first user, an image captured with the second user's camera may be automatically deleted from the second user's device following transmission to the first user. With this scheme, the first user need not lend their device to the second user in order to acquire an image of themselves taken by the second user.

The sharing of images in this way may be initiated by a wireless request. The first user may, as an example, initiate a brief conversation with the second user in which the first user asks whether the second user would be willing to help out the first user by taking their picture. If the second user is willing to help, the first user may then send a wireless image capture request from the first user's device to the second user. In response to receipt of the wireless request, the request can be displayed for the second user in the form of an on-screen selectable option on the display of the second user's device. Once the second user responds affirmatively (e.g., by assenting to the on-screen selectable option on the second user's device using a button press on the selectable option or other user input), a camera application may be launched on the second user's device and a secure wireless link may be established between the first and second user's devices. Images can then be shared across this link. For example, in response to acceptance of the selectable option on the second user's device, the second user may automatically be provided with an on-screen camera interface that allows the second user to compose an image of the first user. The image of the first user may be acquired in response to a button press (e.g., on-screen touch input on a button icon) by the second user on the second user's device or by a remote signal from the first user (e.g., a remote image capture trigger signal that the first user's device sends to the second user's device in response to a button press input such as a touch screen input on a remote trigger button displayed on the first user's device). Whether the image is captured by the camera of the second user's device in response to a button press of the second user or a remote trigger command received wirelessly from the first user, the captured image may then be automatically wirelessly transferred over a secure peer-to-peer link or an indirect wireless link from the second user's device to the first user's device. The captured image may thereafter be automatically deleted from the second user's device (e.g., to preserve privacy for the first user). Optionally, the first user can share the captured image with the second user and/or may otherwise indicate permission for the captured image to be retained by the second user).

Figure 2:
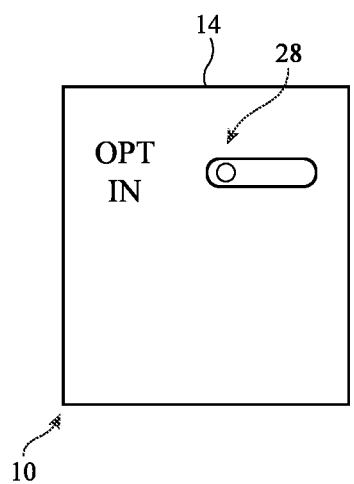
FIG. 2 is a diagram of an illustrative electronic device which is presenting a user with a selectable option to opt in or out of receiving wireless requests such as image capture requests from other users in accordance with an embodiment.

To avoid sending wireless image capture requests to more people than desired, users may be provided with an opportunity to opt in or opt out of receiving such wireless requests. As an example, each user's device 10 may use its display 14 to present the user with selectable options such as option 28 of FIG. 2 (e.g., on-screen menu options or other options with which a user may interact using touch input and/or other user input). The options may allow the user to opt in or opt out of receiving wireless requests from others to share images.

Figure 3:
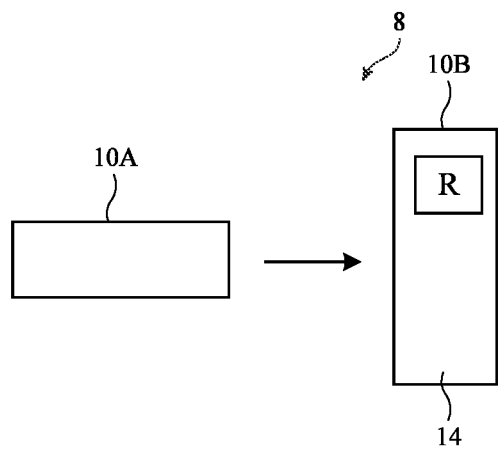
FIG. 3 is a diagram of a first electronic device providing a wireless image capture request to a second electronic device that is displayed as a selectable option on a touch screen display of the second electronic device in accordance with an embodiment.

Another way in which excessive wireless requests can be avoided involves using localized wireless communications. As shown in FIG. 3, for example, a first user at first device 10A may use UWB communications to send a wireless request R to second device 10B of a second user that is displayed as a selectable option on the display 14 of second device 10B for the second user to accept (e.g., by touch input on a selectable acceptance button or other option). By using UWB communications, the wireless request will only be successfully received at second device 10B from first device 10A if satisfactory proximity criteria are satisfied (e.g., such a request will only be presented on device 10B in response to determination by devices 10A and/or 10B and/or other equipment in system 8 that devices 10A and 10B are within a predetermined distance of each other and/or in response to determination that device 10A is pointing at device 10B when the wireless request is transmitted from device 10A). The first user at device 10A may be presented with a selectable on-screen option on a touch screen display in device 10A (e.g., "transmit request now") that the first user can select (e.g., by touch input) to send the wireless request to the second user.

Figure 4:
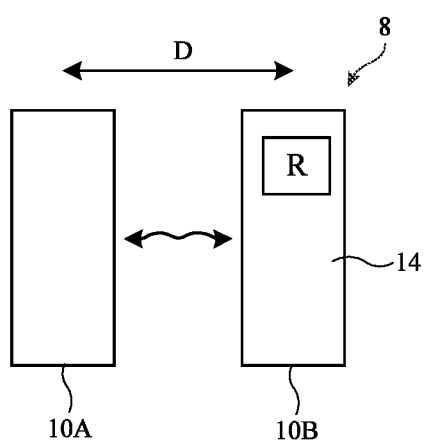
FIG. 4 is a diagram of two electronic devices that are in communication using near-field communications in accordance with an embodiment.

If desired, the first user's device 10A may, as shown in FIG. 4, use NFC to send a wireless request to the second user's device 10B while the first user's device is within near-field communications range D (e.g., 20 cm or less or other suitable NFC communications range) of the second user's device. In these proximity-based arrangements, only users in close proximity to the first user (e.g., only the second user in this example) will receive wireless requests.

In general, any suitable technique may be used to establish a secure wireless link between device 10A and 10B. As an example, device 10A may present an on-screen bar code that the camera in device 10B may scan or may present a code or other information that the second user can enter into the second device. Upon scanning the bar code with the second device or entering the code or other information with the second device, a secure link though a shared cloud service or other secure wireless link may be established using explicit and/or implicit address information and authentication information contained in the scanned bar code or manually entered code or other information. Communications between devices 10A and 10B may be peer-to-peer communications or may, if desired, involve communications through additional devices 10 (e.g., remote servers, etc.).

Figure 5:
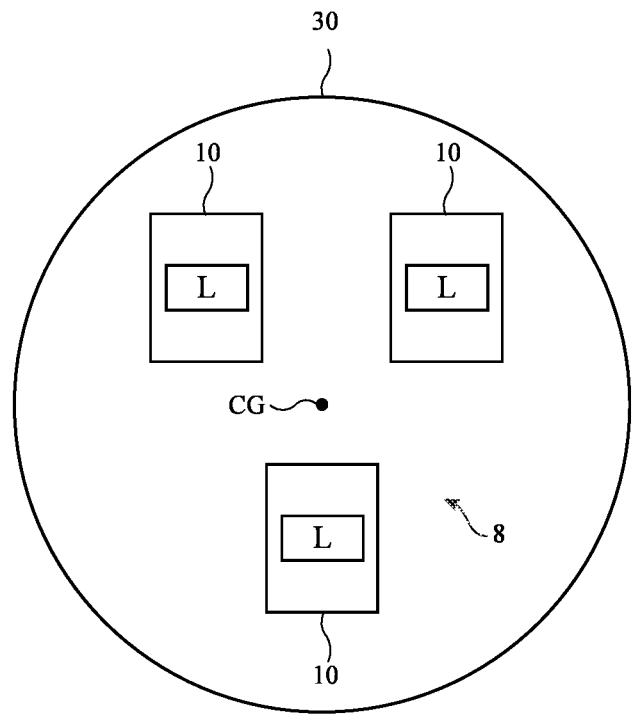
FIG. 5 is a diagram of a group of electronic devices with location measurement capabilities used to determine when the electronic devices are within proximity of each other.

If desired, devices 10 may include satellite navigation circuitry or other location sensing circuitry L, as shown in FIG. 5. By transmitting measured location information (e.g., GPS coordinates or other location measurements) to a common server, the common server (and/or one or more other devices 10 in system 8) can determine whether devices 10 are within range of each other. For example, it can be determined which of devices 10 are within a predetermined distance of a central geographic location CG. In this way, devices 10 that are within a predetermined geographic area such as area 30 of FIG. 5 can be identified. As an example, all devices 10 that are within 10 m of a central location can be assumed to be in relatively close proximity to each other, so that the users of these devices can see each other and can interact with each other. Devices 10 that are within area 30 may, as an example, belong to attendees at a wedding, party, or other event. Devices 10 that are within area 30 can each be provided with wireless requests that are displayed on their displays (see, e.g., requests R of FIGS. 3 and 4). The requests may be wirelessly transmitted from a remote server (e.g., a cloud service with which each of the users has registered, may be initiated by a single attendee at the event (e.g., by initiating the request from that attendee's device 10), and/or may otherwise be provided to each device 10 in area 30 and/or each device 10 that has registered with the cloud service.

In response to receiving affirmative responses to each of these requests and/or in response to satisfactory registration of devices 10 with the cloud service, the cloud service (and/or devices 10) may share captured images from devices 10 among devices 10. If desired, images may be processed (e.g., using facial recognition techniques to recognize the faces of attendees that can be matched to facial images of the attendees uploaded to the cloud service during registration and/or using other image processing techniques). For example, a cloud server that has obtained all images from the users at an event may identify which images contain user X (e.g., the face of user X), so that only those images are distributed to user X. In addition to filtering images based on the identity of the users present in the images, filtering may be performed based on location (e.g., images may only be shared with others that come into close proximity of each other such as when these users are located in a subregion of area 30), may be performed based on time (e.g., images from devices 10 may only be shared if those images were captured between 5 PM and 10 PM or other predetermined time range), and/or may be performed based on whether the images satisfy other predetermined image sharing criteria.

Figure 6:
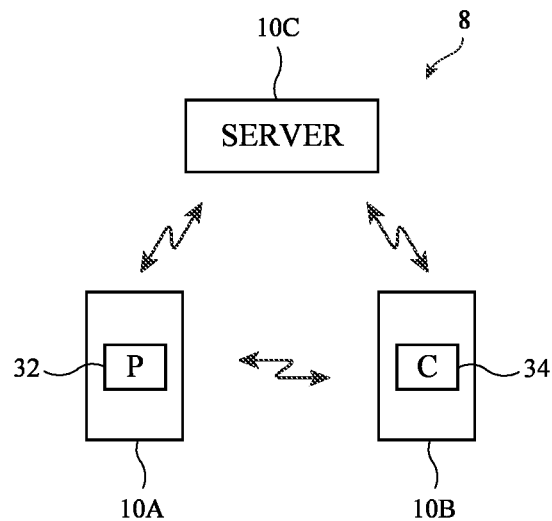
FIG. 6 is a diagram of an illustrative system in which a first electronic device is receiving a captured image from a second electronic device in accordance with an embodiment.

FIG. 6 is a diagram of an illustrative embodiment of system 8 that contains a first device 10A associated with a first user (sometimes referred to as a shared image requester), a second device 10B associated with a second user (sometimes referred to as a stranger or request accepter), and optional cloud computing equipment (e.g., a device 10 in system 8 such as server 10C). The devices of system 8 of FIG. 6 may communicate wirelessly using circuitry 13 (FIG. 1). Devices 10A and 10B may communicate directly (e.g., using one or more peer-to-peer wireless links) and/or via remote computing equipment (one or more devices 10) such as one or more remote servers 10C (e.g., cloud computing equipment, equipment coupled to a wireless local area network, etc.).

In an illustrative arrangement, the first user approaches the second user and asks whether the second user would permit the second user's device to be used in capturing images (e.g., images of the first user and, if desired, companions of the first user). If the second user is willing, the first user may use device 10A (e.g., the user may select an on-screen "send request" option on display 14 of device 10A) to send a wireless request R (see, e.g., FIGS. 3 and 4) to the second user to which the second user may agree (e.g., by answering affirmatively to an on-screen request query presented automatically on the second user's device 10B in response to receipt at the second device of the wireless request transmitted from device 10A). Once the second user responds affirmatively, device 10B may automatically launch camera application 34 on device 10B, which presents a real-time image from camera 26 of device 10B. The second user may then point camera 26 at the first user so that the first user is visible in the frame of camera 26 (e.g., the first user shown on the display 14 of device 10B).

Image capture may be triggered in at least two ways. First, application 34 on device 10B may present a selectable camera button such as a touch screen camera button (or may use a hard button) and may capture the image when the second user presses this button or provides other suitable user input directing device 10B to capture the image. Second, device 10A may present an optional remote trigger application such as application 32 of FIG. 6 on the display 14 of device 10A. The remote trigger application may be accompanied by a real-time view of the first user captured by the camera of the device 10B. The first user may remotely trigger capturing of the image by pressing on an selectable image capture button on display 14 of device 10A that is associated with the remote trigger application of device 10A, causing device 10A to send a wireless image capture command to device 10B that instructs application 34 to use camera 26 of device 10B to capture the image. If desired, the image may be captured upon satisfaction of other triggering criteria (e.g., autofocus lock, timer expiration, voice command, recognition of a particular facial expression such as a smile, etc.)

After the image has been captured by device 10B, device 10B may wirelessly convey the captured image to device 10A for storage on device 10A. The image may be conveyed directly (e.g., using a peer-to-peer wireless link) or may be conveyed indirectly (e.g., by wirelessly uploading the captured image to server 10C from device 10B and wirelessly downloading the captured image from server 10C to device 10A). The first user may store the captured image among other captured images on device 10A (and, if desired, among other captured images in a cloud service associated with an account of the first user on server 10C). The captured image may, as an example, be stored on device 10A (and/or device 10C) among a collection of images that the first user previously captured using camera 26 of device 10A. To enhance privacy for the first user, application 34 at device 10B may automatically delete the captured image from device 10B after sending the captured image to device 10A.

Figure 7:
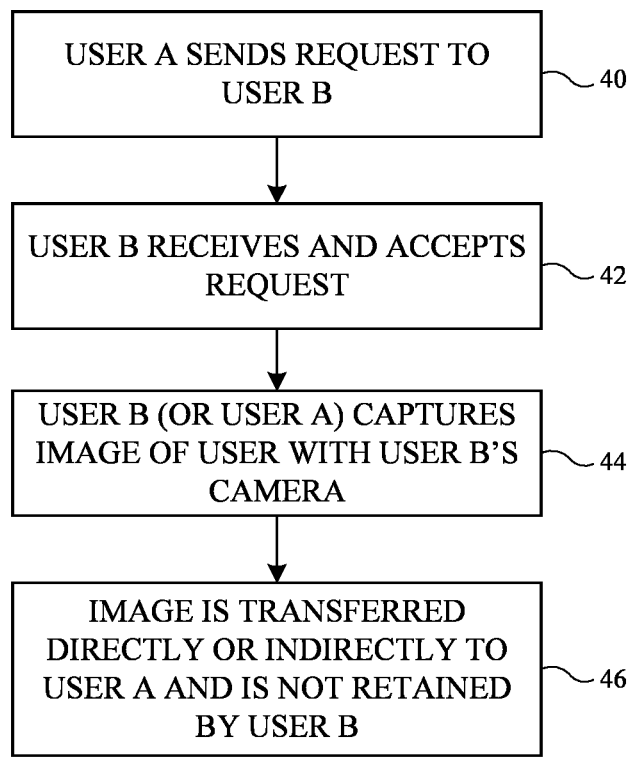
FIG. 7 is a flow chart of illustrative operations involved in using the system of FIG. 6 in accordance with an embodiment.

FIG. 7 is a flow chart of illustrative operations involved in using system 8 of FIG. 6. During the operations of block 40, a first user (user A) may use device 10A to wirelessly send a request to a second user (user B). The request may be sent, for example, by selecting an option that is displayed on the display of device 10A (e.g., by providing touch screen input to trigger sending the request or otherwise selecting a selectable option that initiates the wireless request transmission process). The first user may send the request after asking the second user whether the second user is willing to use the second user's device (device 10B) to take a picture of the first user. The request may be sent using near-field communications (e.g., after the first user brings device 10A into close proximity to device 10B), may use UWB communications, may use wireless local area network communications, etc.

During the operations of block 42, device 10B receives and processes the wireless request from device 10A. Device 10B may, as an example, display a selectable "accept request" option on the touch screen display of device 10B in response to wireless receipt of the request. The second user can accept the first user's request by providing touch input to select the "accept request" option or otherwise providing user input that directs device 10B to accept the request. In response to acceptance of the request, device 10B may automatically launch a camera application or otherwise facilitate the capturing of an image by the camera of device 10B.

The image may be captured during the operations of block 44 by the second user. For example, the second user may press an on-screen button on the display of device 10B or may otherwise initiate image capture operations on device 10B (e.g., after pointing the camera of device 10B at the first user, so that the first user and companions of the first user are in the captured image). If desired, the first user may trigger the image capture process remotely (e.g., by sending a wireless command for device 10A to device 10B that directs device 10B to capture the image). Such a wireless command may sometimes be referred to as a remote image capture command or image capture trigger command and may be transmitted from device 10A in response to a button press, menu selection, or other user input by the first user at device 10A.

During the operations of block 46, the image that was captured using the camera of device 10B may be wirelessly transferred from device 10B to device 10A. The wireless transfer process may involve direct (peer-to-peer) wireless communications (e.g., via NFC, Bluetooth, etc.) or may use indirect communications (e.g., the image may be transmitted wirelessly via a cloud computing service).

Figure 8:
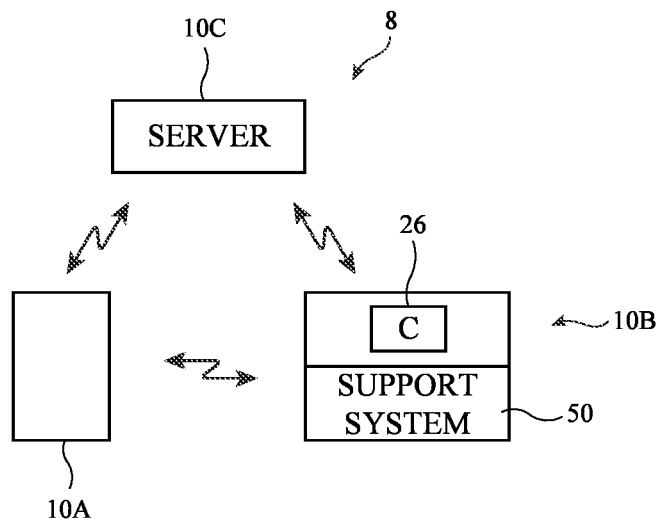
FIG. 8 is a diagram of an illustrative system in which an electronic device is receiving a captured image from an electronic device such as a camera system associated with a stationary or mobile platform in accordance with an embodiment.

In the illustrative example of FIG. 8, device 10A is a portable electronic device associated with a user and device 10B includes a mobile or stationary camera system associated with an amusement park or other entity (sometimes referred to as a public camera system because the system is available to many users). Device 10B in this type of scenario may be operated autonomously. Device 10B may have a camera 26 mounted on a support system 50 such as a stationary platform (e.g., a kiosk, pedestal, amusement ride support structure, etc.) or a mobile platform (e.g., an autonomous and/or manually operated drone). Device 10B may use Bluetooth advertisement messages to advertise its presence to devices such as device 10A, device 10A may use Bluetooth advertisement messages to advertise its presence to devices such as device 10B, a user of device 10A may register with device 10B (e.g., a cloud computing service that is associated with device 10B), and/or device 10A and device 10B may otherwise identify themselves to each other and/or may otherwise indicate to each other that they are near to each other. As the user of device 10A comes within range of device 10B, device 10B captures images of the user of device 10A. These images may then be shared with the user of device 10A. For example, device 10B may transmit captured images from device 10B to device 10A directly (e.g., over a Bluetooth link, NFC link, etc.) or over an indirect wireless link. If desired, device 10B may capture numerous images of people in the vicinity of device 10B. To ensure privacy, device 10B may transmit only those captured images to device 10A that are associated with the user of device 10A. As an example, device 10B may detect when device 10A is within range by communicating with nearby devices using near-field communications. This allows device 10B to detect the physical presence of device 10A in proximity to device 10B (e.g., presence can be detected by satisfactory establishment of an NFC link between device 10A and device 10B). If desired, device 10A may transmit Bluetooth advertisement messages. Using signal strength measurements and/or other measurements, device 10B may detect the presence of device 10A and may determine when device 10A is near to device 10B. Captured images that are acquired when device 10A is known to be in the vicinity of device 10B can then be transmitted only to the user of device 10A and not to the users of other devices 10 in system 8. As an example, device 10B can use information on the proximity of device 10A and device 10B and previously obtained registration information (e.g., information on the identity of the user of device 10A) in distributing images of the user of device 10A only to device 10A.

Figure 9:
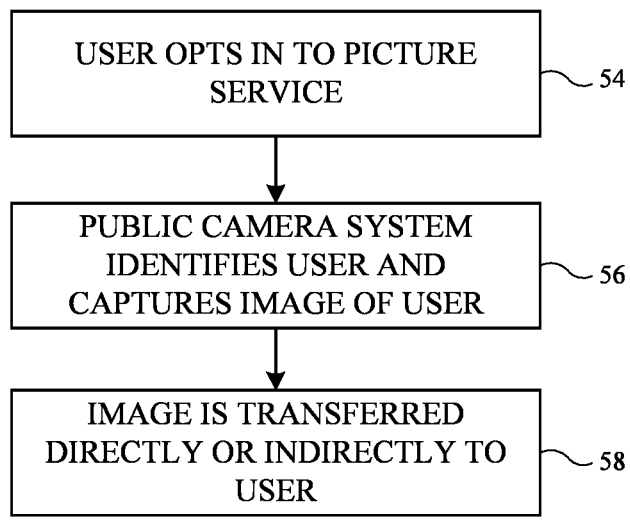
FIG. 9 is a flow chart of illustrative operations involved in using the system of FIG. 8 in accordance with an embodiment.

FIG. 9 is a flow chart of illustrative operations involved in using a system of the type shown in FIG. 8.

During the operations of block 54, a user of device 10A may register with a picture sharing service (e.g., a cloud service implemented on a remote server such as device 10C that is associated with device 10B). The picture sharing service may, as an example, be associated with an amusement park or other entity that operates device 10B. Device 10B may be mounted on a stationary platform or a mobile platform such as a drone.

After registering with the service, the user of device 10A may move about facilities of the entity associated with device 10B. Wireless communications and/or other techniques (e.g., location measurement techniques) may be used to determine when device 10A is within the vicinity of device 10B. With one illustrative arrangement, device 10A transmits periodic wireless signals (e.g., NFC beacons, Bluetooth advertisement messages, etc.). Device 10B may monitor for these signals. In response to detecting and processing a signal from device 10A that identifies device 10A, device 10B may conclude that device 10A is within proximity of device 10B. With another illustrative arrangement, device 10B may transmit the periodic wireless signals and device 10A may monitor for the presence of these signals. When device 10A detects the presence of device 10B in this way, device 10A may communicate with device 10B (e.g., device 10A may provide information to device 10B that identifies device 10A and the user to device 10B). In yet another illustrative arrangement, device 10A may measure its location using a satellite navigation receiver (e.g., a GPS receiver) or other location measurement circuitry and may, when it is determined that device 10A is at a location that is nearby the known location of device 10B, inform device 10B wirelessly that device 10A is present in the vicinity of device 10B. Following identification of the close proximity between the user of device 10A and the camera of device 10B using these approaches or other suitable approaches, device 10B may capture an image of the user during the operations of block 56.

During the operations of block 58 the captured image from device 10B may be transferred wirelessly to device 10A. The image may be transferred directly or indirectly. For example, an NFC link, Bluetooth link, or other peer-to-peer wireless link between device 10B and device 10A may be used to securely transfer the captured image from device 10B to device 10A. As another example, the captured image may be uploaded from device 10B to device 10C and then downloaded from device 10C to device 10A. The image that is transmitted from device 10B to device 10A may be deleted from device 10B, if desired. Prior to receiving images, the user of device 10A may register with device 10B at step 54 (including, if desired, remote server equipment associated with device 10B), so that device 10B is aware that the user of device 10A has opted in to receiving captured images of the user from device 10B and so that the control circuitry of device 10B can use information identifying device 10A in wirelessly sending the captured image from device 10B to device 10A (e.g., directly or indirectly via server 10C). Image deletion may be performed immediately or after a predetermined waiting period. As with the other illustrative embodiments for transferring images to device 10A from other equipment, a single image or multiple captured images may be transferred.

Figure 10:
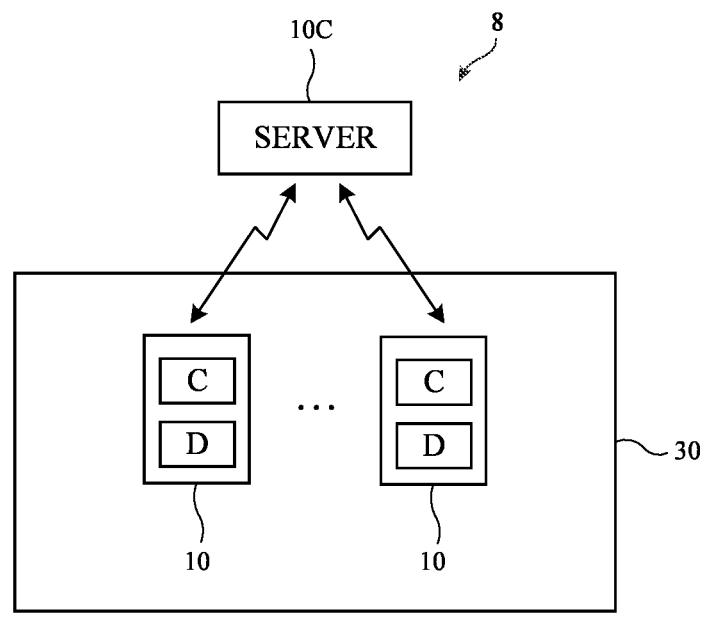
FIG. 10 is a diagram of an illustrative system in which a group of multiple devices share photos and other content in accordance with an embodiment.

FIG. 10 is a diagram of an illustrative system in which a group of multiple users associated with respective devices 10 may share images. The group of users may be, as an example, attendees at a wedding or other event. Each user may have a respective electronic device with a camera and may take images of other users at the event. Images that are captured may be transferred wirelessly to a cloud computing equipment service (e.g., a remote server such as electronic device 10C). Images may be transferred to the cloud service in real time or may be uploaded in a batch at a later time (e.g., after the event has concluded). Following the event, some or all of the images that have been collected by device 10C may be shared with the users.

To ensure that the images are shared only with attendees of the event, users may register with device 10C as event attendees prior to (or after) the event. System 8 may use a kiosk-mounted device or other given device 10 located at the event to determine when the devices 10 of users are attending the event. The given device 10 may, as an example, use Bluetooth messages and signal strength measurements to determine when registered users are present in an area 30 that is associated with the event. If desired, location measurements may be taken by each device 10 (e.g., using satellite navigation system circuitry, UWB circuitry, and/or other circuitry). These location measurements may be processed by device 10C to determine which devices 10 are within predetermined area 30 (e.g., an area of a size associated with the event). The geographic boundaries of area 30 may be measured and stored in device 10C to determine whether devices 10 are in or out of the event or the distance of each device 10 may be measured with respect to a central point (e.g., distance from the given device 10) or other geographic markers. Geographic location checking operations such as these may enhance privacy by ensuring that only actual attendees can share images. In addition to determining whether devices 10 are associated with event attendees based on geographical location (e.g., by comparison to known area 30, etc.), time criteria and/or other criteria may be used to identify devices 10 (and images captured with the cameras in those devices) that are associated with event attendees. As an example, an event may have a start time and stop time and this information may be used to filter out non-event images (e.g., images that device 10C determines were captured at times that are before the start time or after the stop time). Device 10C (e.g., the cloud service associated with the event) may also filter images using image recognition techniques. For example, each user may upload an image of themselves (e.g., their face) when registering for the service. Device 10C may then distribute to each user only those images that are determined from image recognition processing to contain an image of that user. If desired, other filtering techniques may be used when determining which images to share with each device 10 or all images from the event (e.g., all images provided to device 10C from devices 10) may be distributed to all devices 10.

Figure 11:
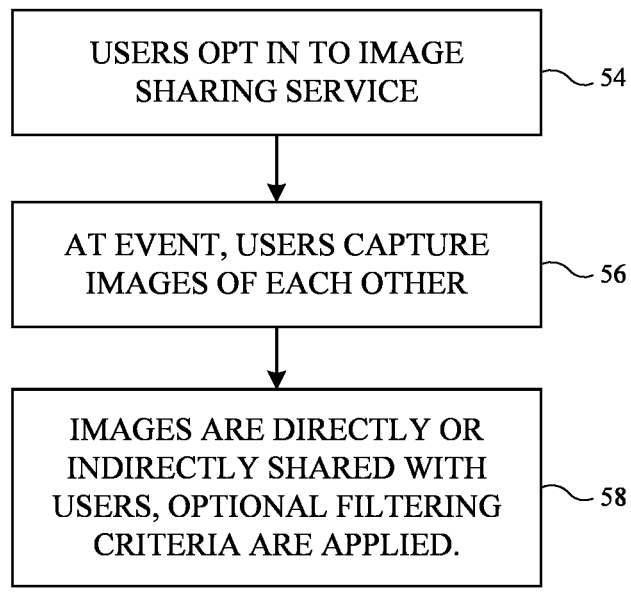
FIG. 11 is a flow chart of illustrative operations in using the system of FIG. 10 in accordance with an embodiment.

Illustrative operations associated with using system 8 of FIG. 10 are shown in FIG. 11.

During the operations of block 60, users attending an event may use their devices 10 to register with an image sharing service that is associated with the event or to otherwise opt in to the sharing of captured images at the event. During registration, each attendee may provide registration information that identifies the attendee and the attendee's device. For example, the registration information may include device address information and/or user account information and may optionally information such as an image of the attendee (e.g., an image of the face of the registering attendee to be used during subsequent image processing operations such as facial recognition operations used to determine which captured images contain an image of the face of the registering attendee and should therefore be shared with that attendee).

The image sharing service may be operated by an organization that provides image sharing services to multiple different events. A user may opt into the image sharing service for a particular event by registering with the service, by responding affirmatively to an opt-in request (e.g., a registration request) that is provided to the user's device 10 when the user is in proximity to wireless communications equipment associated with the service that is located at the event, or may otherwise indicate interest in sharing images captured at the event. As an example, each device 10 may be provided with a wireless request to opt in to the sharing process from device 10C. The request may appear in the form of a notification presented on the display of the user's device. Bluetooth advertising messages, NFC beacons, and/or other wireless messages from device 10C may be used to cause the notifications to appear on devices 10. If a user desires to opt into the service, the user may respond affirmatively to the notifications.

After registering and/or otherwise opting in to the image sharing process, each user may, during the operations of block 62, use their device 10 to capture images during the event. The images may include images of each other (e.g., the users associated with other devices 10).

During the operations of block 64, images captured with devices 10 may be wirelessly uploaded to device 10C (e.g., one or more remote servers and/or other cloud computing equipment). Device 10C may receive the images via any suitable wireless links (e.g., wireless local area network links, cellular telephone links, etc.). The images received at device 10C may be optionally processed by device 10C. For example, device 10C may use image capture information (e.g., device location information and other information measured during image capture and associated with each image as metadata) to determine whether uploaded images fall within a geographic area associated with the event and/or to determine whether the images correspond to a time period associated with the event. If desired, device 10C may select images for sharing that satisfy other sharing criteria (e.g., device 10C may use facial recognition techniques or other image processing techniques to determine which images should be filtered out because particular users' faces are or are not present in particular images) and/or device 10C may otherwise determine which images are to be shared with each user. Optionally, no filtering is applied and all images are made available to all event attendees. During block 64, filtered images (or, if desired, all images) that were provided to device 10C from devices 10 at the event may be provided to each attendee's device 10. If desired, each device 10 may be provided with those images taken at the event that contain an image of the user of that device in addition to a set of selected images of general interest (e.g., images selected by an event organizer). Images may be distributed from device 10C to devices 10 wirelessly and may be stored in the storage of each device 10. Privacy may be enhanced in some embodiments by providing each attendee with the ability to block distribution of any captured images that are determined by image recognition operations to contain that attendee (e.g., each attendee may optionally have veto power over all images containing that attendee or at least over the areas in the images that contain that attendee).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is illustrative and various modifications can be made to the described embodiments. The foregoing embodiments may be implemented individually or in any combination.

What is claimed is:

1. A method of providing an image to a user of a first electronic device from a second electronic device, comprising:
   with the first electronic device, sending an image capture request wirelessly to the second electronic device;
   at the second electronic device, wirelessly receiving the image capture request from the first electronic device;
   in response to receipt of the image capture request, displaying a selectable option on a display of the second electronic device; and
   following acceptance of the wireless image capture request at the second electronic device and capturing of an image of the user of the first electronic device with a camera in the second electronic device, wirelessly receiving the captured image from the second electronic device at the first electronic device.

2. The method defined in claim 1 further comprising:
   in response to selection of the selectable option on the display of the second electronic device using touch input, launching a camera application on the second electronic device to allow the camera in the second electronic device to capture the image of the user of the first electronic device.

3. The method defined in claim 2 further comprising:
   in response to pressing a button option displayed by the camera application on the second electronic device:
   capturing the image of the user of the first electronic device; and
   wirelessly transmitting the captured image from the second electronic device to the first electronic device.

4. The method defined in claim 3 further comprising:
   in response to pressing the button option on the second electronic device, deleting the captured image from the second electronic device after the captured image is wirelessly transmitted from the second electronic device to the first electronic device.

5. The method defined in claim 4 further comprising:
   at the first electronic device, storing the received captured image from the second electronic device in a collection of images on the first electronic device that includes images captured using an image sensor in the first electronic device.

6. The method defined in claim 1 further comprising:
   displaying a selectable remote image capture trigger option on a touch screen display of the first electronic device.

7. The method defined in claim 6 further comprising:
   in response to user touch input on the selectable remote image capture trigger option on the touch screen display of the first electronic device, wirelessly transmitting a remote image capture trigger command from the first electronic device to the second electronic device.

8. The method defined in claim 7 further comprising:
   at the second electronic device, capturing the image of the user of the first electronic device in response to receipt of the remote image capture trigger command from the first electronic device.

9. The method defined in claim 1 wherein sending the image capture request comprises using near-field communications circuitry in the first electronic device to send the image capture request to the second electronic device.

10. The method defined in claim 1 wherein sending the image capture request comprises using wireless circuitry selected from the group consisting of: wireless local area network circuitry, cellular telephone circuitry, and ultra-wideband circuitry to send the image capture request to the second electronic device.

11. The method defined in claim 1 further comprising:
at the second electronic device, providing a selectable opportunity to opt in to receipt of wireless image capture requests.

12. A system for wirelessly providing an image to a portable electronic device of a user, the system comprising:
a camera; and
control circuitry configured to:
determine whether the user is registered with a cloud computing service;
determine based on wireless signal measurements whether the portable electronic device is present in proximity to the camera, wherein the camera is configured to capture an image of the user in response to determining that the user is registered with the cloud computing service and that the portable electronic device is present in proximity to the camera; and
automatically wirelessly transmit the captured image to the portable electronic device.

13. The system defined in claim 12 wherein the wireless signal measurements include at least one of:
measurements of wireless signals transmitted from the portable electronic device to the control circuitry and measurements of wireless signals transmitted from the control circuitry to the portable electronic device.

14. The system defined in claim 13 wherein the control circuitry is configured to automatically wirelessly transmit the captured image to the portable electronic device based at least partly on whether the user is registered with the cloud computing service.

* * * * *